United States Patent
Krivopaltsev et al.

(10) Patent No.: US 10,732,782 B1
(45) Date of Patent: Aug. 4, 2020

(54) CONTEXT-AWARE COMPONENT STYLING IN USER INTERFACES OF ELECTRONIC DEVICES

(71) Applicant: INTUIT INC., Mountain View, CA (US)

(72) Inventors: Eugene Krivopaltsev, San Jose, CA (US); Marc J. Attinasi, Ramona, CA (US); Shailesh K. Soliwal, Redwood City, CA (US)

(73) Assignee: INTUIT INC., Mountain View, CA (US)

( * ) Notice: Subject to any disclaimer, the term of this patent is extended or adjusted under 35 U.S.C. 154(b) by 674 days.

(21) Appl. No.: 14/813,019

(22) Filed: Jul. 29, 2015

(51) Int. Cl.
- *G06F 3/048* (2013.01)
- *G06F 3/0481* (2013.01)
- *G06F 16/955* (2019.01)

(52) U.S. Cl.
CPC .......... *G06F 3/0481* (2013.01); *G06F 16/955* (2019.01)

(58) Field of Classification Search
CPC .................. G06F 3/0481; G06F 17/30876
See application file for complete search history.

(56) References Cited

U.S. PATENT DOCUMENTS

| | | |
|---|---|---|
| 6,694,482 B1 | 2/2004 | Arellano et al. |
| 6,754,668 B2 | 6/2004 | Noble et al. |
| 6,782,370 B1 | 8/2004 | Stack |
| 7,133,895 B1 | 11/2006 | Lee et al. |
| 7,149,776 B1 | 12/2006 | Roy et al. |
| 7,194,473 B1 | 3/2007 | Hichwa et al. |
| 7,712,023 B1 | 5/2010 | Bryan |
| 7,726,561 B2 | 6/2010 | Katyal et al. |
| 7,814,107 B1 | 10/2010 | Thirumalai et al. |
| 7,865,412 B1 | 1/2011 | Weiss et al. |
| 8,356,276 B2 | 1/2013 | Bender |

(Continued)

FOREIGN PATENT DOCUMENTS

| | | |
|---|---|---|
| JP | 2009217676 A | 9/2009 |
| KR | 1020090042018 A | 4/2009 |
| WO | 2013085427 A1 | 6/2013 |

OTHER PUBLICATIONS

Gitana Software Inc., "Alpaca—HTML5 Forms for Jquerey-Form Buttons", Jun. 5, 2014, Retrieved from the Internet on Jul. 2, 2018: URL: https://web.archive.org/web/20140605100521/http://alpacajs.org:80/examples/components/form-controls/buttons.html (3 pages).

(Continued)

*Primary Examiner* — Stephen S Hong
*Assistant Examiner* — Hope C Sheffield
(74) *Attorney, Agent, or Firm* — Patterson + Sheridan, LLP (57) ABSTRACT

The disclosed embodiments provide a system that renders a view component in a user interface of an application on an electronic device. During operation, the system generates, from content describing a view for display in the user interface, a styling path that includes a position of the view component in a content hierarchy of the view. Next, the system selects, by a styling component executing on a processor in the electronic device, a style context for the view component from a collection of style contexts by matching at least a subset of the styling path to an identifier for the style context. The system then uses the style context to render the view component in the view.

20 Claims, 5 Drawing Sheets

(56) References Cited

U.S. PATENT DOCUMENTS

| | | | |
|---|---|---|---|
| 8,909,548 B1 | 12/2014 | Ran et al. | |
| 8,924,269 B2 | 12/2014 | Seubert et al. | |
| 8,930,253 B1 | 1/2015 | Ball | |
| 8,996,407 B2 | 3/2015 | Weiss et al. | |
| 9,286,332 B1 | 3/2016 | Roumeliotis et al. | |
| 9,400,660 B1 | 7/2016 | Krivopaltsev et al. | |
| 2001/0011250 A1 | 8/2001 | Paltenghe et al. | |
| 2002/0165880 A1 | 11/2002 | Hornsby et al. | |
| 2004/0104929 A1* | 6/2004 | Chen | G06F 9/451 715/738 |
| 2004/0135807 A1 | 7/2004 | Pickering et al. | |
| 2004/0143502 A1 | 7/2004 | McClung | |
| 2004/0189670 A1 | 9/2004 | Govindan et al. | |
| 2005/0060647 A1* | 3/2005 | Doan | G06F 17/30554 715/205 |
| 2005/0114361 A1 | 5/2005 | Roberts et al. | |
| 2005/0193368 A1 | 9/2005 | Becker et al. | |
| 2006/0041546 A1 | 2/2006 | Ahn | |
| 2006/0174217 A1 | 8/2006 | Yan et al. | |
| 2006/0200749 A1 | 9/2006 | Shenfield | |
| 2006/0242124 A1 | 10/2006 | Fields et al. | |
| 2006/0242566 A1* | 10/2006 | Dunietz | H04L 67/02 715/209 |
| 2007/0050778 A1 | 3/2007 | Lee et al. | |
| 2007/0073683 A1 | 3/2007 | Kobayashi et al. | |
| 2007/0078925 A1 | 4/2007 | Neil et al. | |
| 2007/0162274 A1 | 7/2007 | Ruiz et al. | |
| 2007/0238475 A1 | 10/2007 | Goedken | |
| 2008/0065569 A1 | 3/2008 | Dutt et al. | |
| 2008/0071657 A1 | 3/2008 | Matic | |
| 2008/0091784 A1 | 4/2008 | Sundstrom | |
| 2010/0199198 A1 | 8/2010 | Relyea | |
| 2011/0023016 A1 | 1/2011 | Khader et al. | |
| 2011/0093514 A1* | 4/2011 | Brown | G06F 17/30557 707/810 |
| 2011/0154305 A1 | 6/2011 | LeRoux et al. | |
| 2011/0282714 A1 | 11/2011 | Cullen, III et al. | |
| 2012/0084185 A1 | 4/2012 | Ciaramitaro et al. | |
| 2012/0226708 A1 | 9/2012 | Srinivasa et al. | |
| 2012/0240066 A1 | 9/2012 | Bovett et al. | |
| 2012/0323889 A1 | 12/2012 | Marum et al. | |
| 2013/0024766 A1 | 1/2013 | Gupta et al. | |
| 2013/0117351 A1 | 5/2013 | Zoheir et al. | |
| 2013/0159228 A1 | 6/2013 | Meijer et al. | |
| 2013/0219024 A1* | 8/2013 | Flack | H04L 67/2804 709/219 |
| 2013/0283305 A1 | 10/2013 | Hirsch | |
| 2013/0326430 A1* | 12/2013 | Devi | G06F 3/0488 715/863 |
| 2014/0052840 A1 | 2/2014 | Shukla | |
| 2014/0101539 A1* | 4/2014 | Ma | G06F 17/30896 715/235 |
| 2014/0125672 A1 | 5/2014 | Winternitz et al. | |
| 2014/0129397 A1 | 5/2014 | Lazerson | |
| 2014/0136954 A1 | 5/2014 | Ligman et al. | |
| 2014/0136955 A1 | 5/2014 | Lee et al. | |
| 2014/0201616 A1 | 7/2014 | Turner et al. | |
| 2014/0229814 A1 | 8/2014 | Wright et al. | |
| 2014/0245122 A1* | 8/2014 | Oro | G06F 17/2785 715/230 |
| 2014/0280515 A1 | 9/2014 | Wei et al. | |
| 2014/0337414 A1 | 11/2014 | Sojoodi et al. | |
| 2015/0074518 A1* | 3/2015 | Rumsey | G06F 17/248 715/235 |
| 2015/0095767 A1* | 4/2015 | Ebner | G06F 16/9577 715/238 |
| 2015/0310052 A1 | 10/2015 | Konik et al. | |
| 2016/0027107 A1 | 1/2016 | McDonald et al. | |
| 2016/0036935 A1 | 2/2016 | Jaskiewicz et al. | |
| 2016/0055126 A1 | 2/2016 | Doerr et al. | |
| 2016/0078567 A1 | 3/2016 | Goldman et al. | |
| 2016/0092994 A1 | 3/2016 | Roebuck et al. | |
| 2016/0094612 A1 | 3/2016 | Lockhart et al. | |
| 2016/0104513 A1* | 4/2016 | Bloch | G11B 27/34 715/720 |

OTHER PUBLICATIONS

Gitana Software Inc., "Alpaca—Easy Forms for Jquery—Tools & Addons", Jun. 25, 2014, Retrieved from the Internet on Jul. 2, 2018: URL:https://web.archive.org/web/20140625105117/http://alpacajs.org/web/resources.html (1 page).

Anonymous: "Gitana/alpaca_GitHub Readme.md", Oct. 16, 2013, Retrieved from the Internet on Jul. 2, 2018: URL: https://web.archive.org/web20131016124514/https://github.com/gitana/alpaca (4 pages).

Anonymous: "jQuery Mobile—Wikipedia", Aug. 6, 2014, Retrieved from the Internet on Jul. 2, 2018: URL:https://en.wikipedia.org/windex.php?tille=jQuery_Mobile%oldid=620090108 (11 pages).

International Search Report and Written Opinion issued in corresponding PCT/US2014/072553 dated Jun. 30, 2015 (8 pages).

International Search Report and Written Opinion issued in corresponding PCT/US2014/072559 dated Jul. 28, 2015 (8 pages).

International Search Report and Written Opinion issued in corresponding application No. PCT/US2014/072535 dated Jul. 29, 2015 (11 pages).

International Search Report and Written Opinion issued in corresponding application No. PCT/US2014/072543 dated Jul. 29, 2015 (11 pages).

Anonymous: "Content of Save.php", Oct. 16, 2013. URL:https://web.archive.org/web/20131016124514/https://github.com/gitana/alpaca/archive/master.zip (1 page).

International Search Report and Written Opinion issued in the corresponding International Application No. PCT/US2014/053168, dated Apr. 30, 2015 (11 pages).

Office Action in related Canadian Application No. 2,966,388 dated Jun. 1, 2017 (6 page).

Extended European Search Report in related European Patent Application No. 14879253.4 dated Apr. 23, 2018 (11 pages).

* cited by examiner

CONTEXT-AWARE COMPONENT STYLING IN USER INTERFACES OF ELECTRONIC DEVICES

RELATED APPLICATIONS

The subject matter of this application is related to the subject matter in a co-pending non-provisional application by inventors Jay JieBing Yu, Matthew Sivertson, Vinay Kumar, Bojan Beran, Alex Balazs and Luise Felipe Cabrera, entitled "Common Declaration Representation of Application Content and User Interaction Content Processed by a User Experience Player," having Ser. No. 14/463,415 and filing date 19 Aug. 2014.

The subject matter of this application is also related to the subject matter in a co-pending non-provisional application by inventors Ann Catherine Jose, Eugene Krivopaltsev and Jay JieBing Yu, entitled "Content-Driven Orchestration of Multiple Rendering Components in User Interfaces of Electronic Devices," having Ser. No. 14/812,934, and filing date 29 Jul. 2015

The subject matter of this application is also related to the subject matter in a co-pending non-provisional application by inventors Eugene Krivopaltsev, Marc Attinasi and Shailesh Soliwal and filed on the same day as the instant application, entitled "Metadata-Driven Binding of Platform-Agnostic Content to Platform-Specific User-Interface Elements," having Ser. No. 14/813,013 and filing date 29 Jul. 2015.

BACKGROUND

Related Art

The disclosed embodiments relate to user interfaces on electronic devices. More specifically, the disclosed embodiments relate to techniques for performing context-aware component styling in user interfaces of electronic devices.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

Usability is an important consideration in designing user interfaces. In particular, usability considerations may include: the efficiency with which tasks are accomplished through the UI; the user's ability to learn and master the operation of the UI; and/or the availability of feedback, help, documentation, and/or status information within the UI. For example, the user may accomplish tasks more easily and quickly if UI elements are arranged and displayed in a meaningful way within the UI. Consequently, user satisfaction with an application on an electronic device may be highly influenced by characteristics of the user interface provided by the application and/or the user's ability to interact with the user interface through I/O devices of the electronic device.

SUMMARY

As variations in the form factors, platforms, and technologies of electronic devices continue to increase, applications may be required to adapt to the variations. For example, different versions of an application may be released to support execution on different processors, input/output (I/O) devices, operating systems, screen sizes, and/or web browsers.

When an application is updated to support new features, functionality, platforms, form factors, or technologies, portions of the application's user interface may be provided by platform-specific rendering components. For example, the application may include a web view rendering component that embeds web pages within screens of the user interface, as well as one or more native rendering components that use various technologies (e.g., programming languages, libraries, hardware components, etc.) to natively render user-interface components in the user interface.

To reduce overhead associated with updating the user interface of the application, content used to render the interface may be decoupled from the platform-specific rendering components used to perform the rendering. For example, a view in the user interface may be described using structured data such as a JavaScript Object Notation (JSON) object. In turn, the structured data may be used by rendering components implemented on different platforms to render the same view.

View components in a given view may further be rendered according to the positions of the view components in a content hierarchy of the view. To select a style context for a view component in the view, content describing the view is used to generate a styling path for the view component that includes the position of the view component in the content hierarchy. Next, a style context is selected for the view component based on a partial or complete match of the styling path with an identifier for the style context. The style context is then used to render the view component. Because the style context is selected based on configurable metadata describing the view and/or available style contexts for the view, styling of the component may be performed in a dynamic, flexible manner instead of through hardcoding of styles into the user interface of the application.

The disclosed embodiments provide a system that renders a view component in a user interface of an application on an electronic device. During operation, the system generates, from content describing a view for display in the user interface, a styling path that includes a position of the view component in a content hierarchy of the view. Next, the system selects, by a styling component executing on a processor in the electronic device, a style context for the view component from a collection of style contexts by matching at least a subset of the styling path to an identifier for the style context. The system then uses the style context to render the view component in the view.

In some embodiments, generating the styling path for the view component includes appending one or more layers of the content hierarchy between the view component and a top of the content hierarchy to the styling path.

In some embodiments, matching one or more portions of the styling path to the identifier for the style context includes searching the collection of style contexts for the identifier that exactly matches the styling path, and when the collection does not include the identifier that exactly matches the styling path, iteratively removing one or more portions of the styling path until a remainder of the styling path that matches the identifier is found.

In some embodiments, iteratively removing one or more portions of the styling path includes iteratively removing the one or more portions from a middle of the styling path until the styling path contains only a beginning and an end.

In some embodiments, iteratively removing one or more portions of the styling path further includes removing the beginning from an entirety of the styling path to produce the remainder, and subsequently removing the one or more portions from the middle of the remainder to produce one or more variations of the remainder.

In some embodiments, iteratively removing one or more portions of the styling path further includes removing the beginning from the remainder of the styling path to produce a variation of the remainder of the styling path.

In some embodiments, iteratively removing one or more portions of the styling path further includes removing all portions of the styling path except for the end.

In some embodiments, matching one or more portions of the styling path to the identifier for the style context further includes matching the one or more portions of the styling path to a wildcard pattern.

In some embodiments, the style context includes an alignment, a font, a color, a margin, and/or a size.

In some embodiments, the content hierarchy includes a view, a field, a collection, an asset, a label, and a value.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

As variations in the form factors, platforms, and technologies of electronic devices continue to increase, applications may be required to adapt to the variations. For example, different versions of an application may be released to support execution on different processors, input/output (I/O) devices, operating systems, screen sizes, and/or web browsers.

When an application is updated to support new features, functionality, platforms, form factors, or technologies, portions of the application's user interface may be provided by platform-specific rendering components. For example, the application may include a web view rendering component that embeds web pages within screens of the user interface, as well as one or more native rendering components that use various technologies (e.g., programming languages, libraries, hardware components, etc.) to natively render user-interface components in the user interface.

To reduce overhead associated with updating the user interface of the application, content used to render the interface may be decoupled from the platform-specific rendering components used to perform the rendering. For example, a view in the user interface may be described using structured data such as a JavaScript Object Notation (JSON) object. In turn, the structured data may be used by rendering components implemented on different platforms to render the same view.

View components in a given view may further be rendered according to the positions of the view components in a content hierarchy of the view. To select a style context for a view component in the view, content describing the view is used to generate a styling path for the view component that includes the position of the view component in the content hierarchy. Next, a style context is selected for the view component based on a partial or complete match of the styling path with an identifier for the style context. The style context is then used to render the view component. Because the style context is selected based on configurable metadata describing the view and/or available style contexts for the view, styling of the component may be performed in a dynamic, flexible manner instead of through hardcoding of styles into the user interface of the application.

Figure 1:
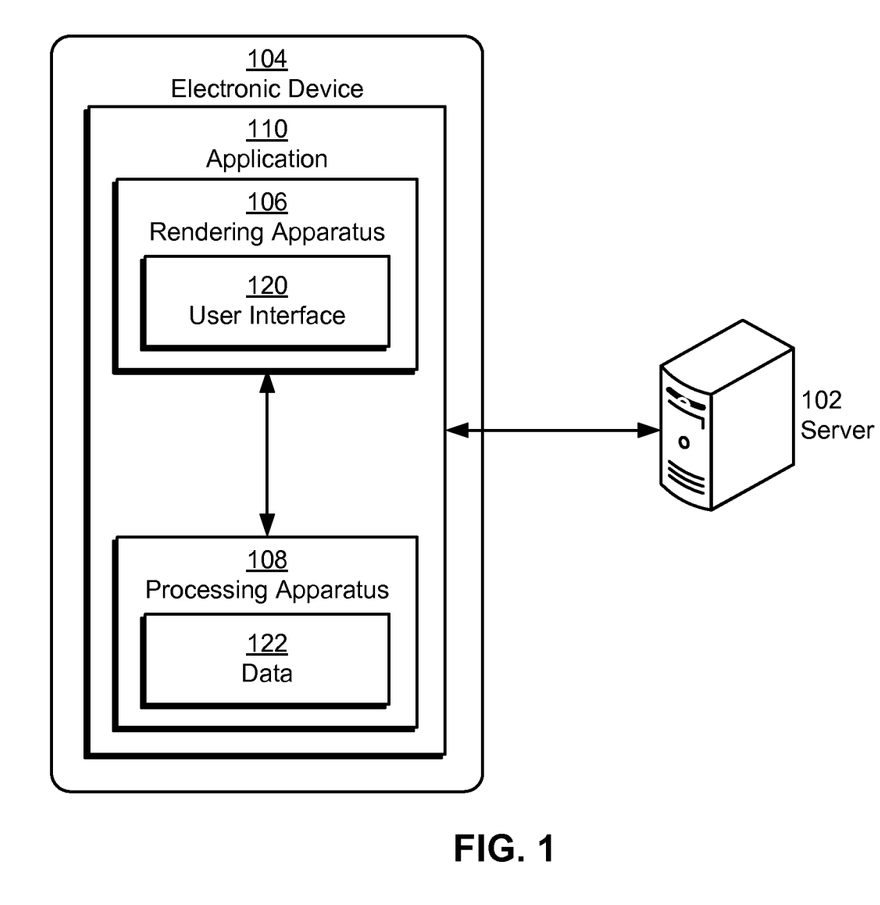
FIG. 1 shows a schematic of a system in accordance with the disclosed embodiments.

The disclosed embodiments provide a method and system for facilitating use of an application on an electronic device. As shown in FIG. 1, an application 110 may reside on an electronic device 104 such as a mobile phone, personal computer, laptop computer, tablet computer, personal digital assistant, navigation system, digital camera, smart watch, and/or portable media player. For example, application 110 may be downloaded from an online application distribution platform, website, and/or server (e.g., server 102) and installed locally on electronic device 104. Alternatively, application 110 may be a web application that is loaded in a web browser of electronic device 104.

Application 110 may perform a set of tasks for a user of electronic device 104. For example, application 110 may allow the user to browse websites, send and receive emails, access and/or organize digital media, create and edit documents, play a game, use mapping and/or navigation services, file taxes, and/or manage personal finances.

During use of application 110, electronic device 104 may use a network connection to obtain data 122 and/or content associated with application 110 from a server 102 and transmit data from application 110 to server 102. For example, electronic device 104 may use a wired, wireless and/or cellular network to send and receive emails, financial information, digital media, game play information, and/or other data 122 or content used by application 110 with server 102. As a result, application 110 may execute using a client-server model.

In addition, interaction between the user and application 110 may be enabled by a user interface 120. For example, user interface 120 may be a graphical user interface (GUI) that displays text, images, documents, menus, icons, thumbnails, form fields, data, buttons, and/or other user-interface elements to the user. The GUI may also accept user input (e.g., gestures, keyboard presses, etc.) that is used to manipulate and/or update the elements. In other words, user interface 120 may be a mechanism for displaying or formatting data 122 or content associated with application 110 for use on electronic device 104.

In one or more embodiments, a rendering apparatus 106 in application 110 generates user interface 120 using content obtained from server 102. For example, rendering apparatus 106 may obtain the content as one or more Extensible Markup Language (XML) documents, JavaScript Object Notation (JSON) objects, and/or other types of structured, platform-agnostic data. The content may describe a set of views, a navigation flow associated with the views, a set of data elements, and/or a data model for the data elements. The described views may specify the text, images, and/or user-interface elements to be included in screens of user interface 120. The described navigation flow may specify the order in which screens of user interface 120 are to be displayed, such as a linear or non-linear flow through screens of user interface 120 that is based on a state of the application and/or data entered into the application by the user. The described data elements may include the names of the data elements, as well as any values of the data elements entered by the user and/or obtained from an external source (e.g., tax forms, public records, emails, etc.). The described data model may specify the data types of the data elements, such as text, Boolean, enumerated, numeric, date, currency, and/or other data types that may be specific to the application.

Rendering apparatus 106 may then use natively executing user-interface components to render one or more views or screens of user interface 120 specified in the structured data. In addition, rendering of user interface 120 may vary with the platform and/or type of electronic device 104. For example, rendering apparatus 106 may tailor the layout of the views in user interface 120 to the dimensions, orientation (e.g., portrait, landscape, etc.), form factor, and/or input/output (I/O) devices of electronic device 104.

Such decoupling of user-interface content from the platform in which the content is rendered may allow updates to user interface 120 to be deployed without changing the source code used to execute the application. For example, a designer or developer may upload a new version of the content to server 102. Once the new version of content is available in server 102, server 102 may provide the new version to rendering apparatus 106, and rendering apparatus 106 may generate one or more views in user interface 120 from the new version instead of previous versions of the content. Platform-independent rendering of content in applications (e.g., application 110) is described further in a co-pending non-provisional application by inventors Jay JieBing Yu, Matthew Sivertson, Vinay Kumar, Bojan Beran, Alex Balazs and Luise Felipe Cabrera, entitled "Common Declaration Representation of Application Content and User Interaction Content Processed by a User Experience Player," having Ser. No. 14/463,415 and filing date 19 Aug. 2014, which is incorporated herein by reference.

Data 122 collected through user interface 120 may then be used by a processing apparatus 108 in application 110 to perform one or more tasks for the user. For example, processing apparatus 108 may validate data 122, format data 122, use data 122 entered by the user to update a state of application 110, use data 122 to generate additional data or files, and/or commit data 122 to storage on electronic device 104 and/or server 102.

In one or more embodiments, rendering apparatus 106 is provided by multiple rendering components that are implemented using different technologies. For example, application 110 may be a tax-preparation application that executes on a mobile device such as a mobile phone, tablet computer, and/or portable media player. New versions of application 110 may be released yearly to accommodate new features, modes of operation, and/or changes in tax code or technology. As portions of application 110 are added or updated, different rendering components may be included in application 110 to support the rendering of user-interface views or components in those portions. As a result, user interface 120 may be provided by rendering components associated with early versions of application 110, widgets added to provide new features to application 110, third-party widgets by third-party developers, rendering components to support platform-specific execution of application 110, and/or web view rendering components that render embedded web pages within user interface 120.

Rendering apparatus 106 may also include an orchestrator that coordinates the rendering of views in user interface 120 by a set of rendering components. The orchestrator may use content from server 102 and/or other metadata to select a rendering component to be used in rendering a view represented by the content. The rendering component may use the content to render the second view, and the orchestrator and/or another component of rendering apparatus 106 may display the view in user interface 120. Orchestration of rendering components in user interfaces is described in a co-pending non-provisional application by inventors Ann Catherine Jose, Eugene Krivopaltsev and Jay JieBing Yu, entitled "Content-Driven Orchestration of Multiple Rendering Components in User Interfaces of Electronic Devices," having Ser. No. 14/812,934, and filing date 29 Jul. 2015, which is incorporated herein by reference.

To further decouple configuration of user interface 120 from the operation of the rendering components, application 110 may use metadata to customize rendering of views in user interface 120 by platform, form factor, orientation, and/or other attributes associated with electronic device 104 without requiring changes to the implementation of the rendering components. A view builder in each rendering component may use a number of metadata definitions to render a view from platform-agnostic content describing the view. The view builder may apply mappings and/or rules from the metadata definitions to platform-agnostic view components in the view to obtain attribute-specific types that are based on one or more attributes (e.g., form factor, orientation, etc.) of the electronic device, as well as platform-specific user-interface elements that implement the attribute-specific types on the platform of the electronic device. Metadata-driven bindings of platform-agnostic content to platform-specific user-interface elements is described in a co-pending non-provisional application by inventors Eugene Krivopaltsev, Marc Attinasi and Shailesh Soliwal and filed on the same day as the instant application, entitled "Metadata-Driven Binding of Platform-Agnostic Content to Platform-Specific User-Interface Elements," having Ser. No. 14/813,013 and filing date 29 Jul. 2015, which is incorporated herein by reference.

Figure 2:
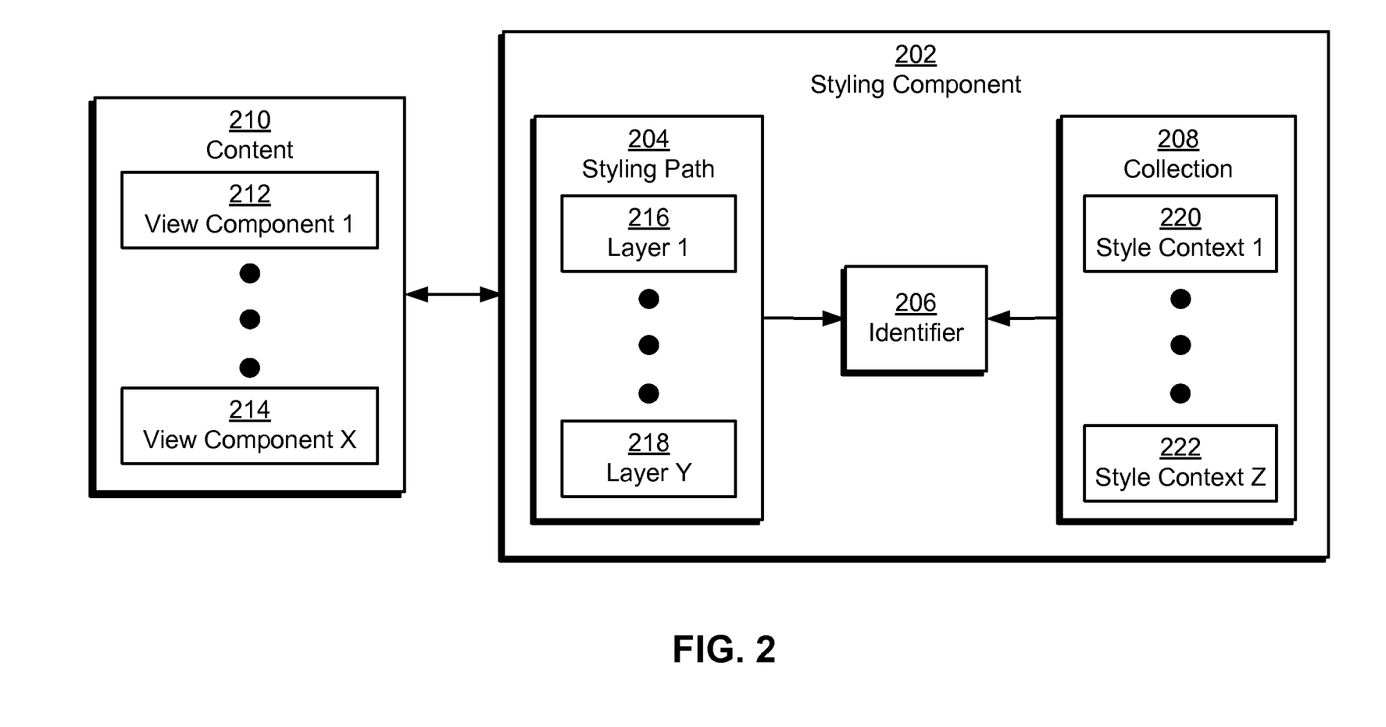
FIG. 2 shows a system for rendering a view component in a user interface of an application on an electronic device in accordance with the disclosed embodiments.

Application 110 may additionally perform dynamic, context-aware styling of view components in the views of user interface 120. As shown in FIG. 2, a styling component 202 may use a styling path 204 for a view component (e.g., view component 1 212, view component x 214) to select a style context (e.g., style context 1 220, style context z 222) for use in rendering of the view component within a view of a user interface. Styling component 202 may execute within a rendering apparatus of an application on an electronic device, such as rendering apparatus 106 of FIG. 1. For example, styling component 202 may be a part of a platform-specific rendering component that renders the view in the user interface (e.g., user interface 120 of FIG. 1) of the application from platform-agnostic content 210 that describes the view, such as a JSON representation of the view.

First, styling component 202 may generate styling path 204 to include a position of the view component in a content hierarchy of the view. The content hierarchy may be specified in content 210 based on layers of encapsulation among view components in the view. For example, content 216 may include a list of view components (e.g., view component 1 212, view component x 214) in view 208. Each view component may be defined by an identifier, a type (e.g., view, text, collection, field, form field, summary, choice, asset, label, etc.), a value, and/or other parameters related to the appearance or use of the view component. A view component that is higher in the content hierarchy, such as an asset, may encapsulate components that are lower in the content hierarchy, such as a label of the asset.

As shown in FIG. 2, styling path 204 for the view component includes a number of layers (e.g., layer 1 216, layer y 218) of encapsulation. Each layer may separate the view component from the top of the content hierarchy. For example, each layer may represent a different type of view component that encapsulates the view component, either directly or indirectly. As a result, styling component 202 may generate styling path 204 by appending one or more layers of the content hierarchy between the view component and the top of the content hierarchy to styling path 204.

For example, content 210 may include the following JSON representation:

```
{
  "asset": {
    "id": "yes.no.question.fields",
    "type": "collection",
    "values": [
      "asset": {
        "id": "yes.no.question.question-11",
        "binding": "returns.IRS1040.ueData.ACA.HasInsuranceNow",
        "type": "choice",
        "label": {
          "asset": {
            "id": "yes.no.question.label.text-31",
            "type": "text",
            "value": "One more thing: do you all have health insurance now?",
            "accessibility": "One more thing: do you all have health insurance now?"
          }
        },
        "choices": [
          {
            "id": "yes.no.question.choices.yes-41",
```

```
            "label": {
              "asset": {
                "id": "yes.no.question.choices-Yes-Label-51",
                "type": "text",
                "value": "All of us have health insurance",
                "accessibility": "All of us have health insurance"
              }
            ...
```

The JSON representation may describe a set of view components arranged within the content hierarchy of the view. The top of the content hierarchy may include a view component with an "id" of "yes.no.question.fields" and a "type" of "collection." The "collection" view component may encapsulate a view component with a "type" of "choice" and an "id" of "yes.no.question.question-11." The "choice" view component may include a "label" that is defined by an "asset" with an "id" of "yes.no.question.label.text-31," a "type" of "text," a "value" of "One more thing: do you all have health insurance now?" and an "accessibility" of "One more thing: do you all have health insurance now?"

The "choice" view component may also include another view component with a "type" of "choices." The "choices" view component may encapsulate multiple possible selection choices within the "choice" view component, including a first choice with an "id" of "yes.no.question.choices.yes-41." The first choice may have a "label" that encapsulates an "asset" with an "id" of "yes.no.question.choices-Yes-Label-51," a "type" of "text," a "value" of "All of us have health insurance," and an "accessibility" of "All of us have health insurance."

The JSON representation may thus be used to render a view that, at the highest layer of the content hierarchy (e.g., the top of the view), displays a title containing the text "One more thing: do you all have health insurance now?" Below the title, the first choice may be displayed as a radio button and/or other type of user-interface element with a label containing the text "All of us have health insurance." Additional choices may also be shown below the first choice based on subsequent descriptions of view components in the view from the JSON representation.

In turn, the styling path of the first choice (e.g., "yes.no.question.choices-Yes-Label-51") in the view may include the following:

collection.choice.choices.fieldTitle.text.regularText

Within the styling path, layers of the content hierarchy may be separated by "." The styling path may be created by appending, in order, the types of view components from the top of the content hierarchy to the first choice. The styling path may begin with the topmost "collection" view component and continue with the "choice" view component and the "choices" view component. Next, "fieldTitle" may be added to the styling path to represent the "label" that follows "choices" in the JSON representation. The "fieldTitle" type is followed by "text," which represents the first choice of "yes.no.question.choices-Yes-Label-51" encapsulated in "label." Finally, "text" is followed by "regularText" to indicate that text in the last view component should be rendered in a regular style instead of a bold/emphasized style or a hyperlink style.

Next, styling component 202 may select a style context for the view component by matching at least a subset of styling path 204 to an identifier 206 for a style context from a collection 208 of style contexts (e.g., style context 1 220, style context z 222). As with other configurable aspects of the user interface, collection 208 may be obtained as platform-agnostic structured data. For example, collection 208 may be provided in a property list, XML document, JSON file, and/or other structured document. Within collection 208, each style context may include style attributes such as an alignment, a font, a color (e.g., text color, background color, etc.), a margin, and/or a size (e.g., font size, dimension, padding size, margin size, column size, etc.).

Style contexts in collection 208 may represent a set of "ideal" styles for various styling paths that can be found in views of the user interface. For example, the style contexts may be created by designers or developers of the application to maintain a uniform user experience across the user interface of the application. However, because rendering hierarchies of views in the user interface may be too long or complex for all possible styling paths to be enumerated in collection 208, style contexts in collection 208 may be selected for view components in a way that provides a "best possible" match between the style contexts and the styling paths of the view components.

During selection of a style context for the view component, styling component 202 may initially search collection 208 for an exact match between an identifier (e.g., identifier 206) in collection 208 and styling path 204. If iterative the styling path does not exactly match an identifier in collection 208, the styling path may be matched to a wildcard pattern representing a style context instead of an exact identifier for the style context. If the styling path does not match a wildcard pattern, styling component 202 may iteratively remove one or more portions of styling path 204 until a remainder of styling path 204 that matches identifier 206 and/or a wildcard pattern is found.

After the style context is selected for the view component, styling component 202 and/or another component of the application may use the style context to render the view component. The component may also store a mapping of the styling path to the style context so that subsequent styling requests for view components with the same styling path can be matched to the same style context without performing the style-selection process for the view components. Such mapping of styling paths to resolved style contexts may thus reduce the processing associated with styling of various components in content 210.

Continuing with the above example, the styling path of "collection.choice.choices.fieldTitle.text.regularText" may be matched to a style context in the following manner. Collection 208 may initially be searched for a style context with an identifier that matches the entirety of the styling path. If no such style context can be found, one or more portions of the styling path may be iteratively removed until a remainder of the styling path that matches an identifier in collection 208 is found. In addition, iterative removal of portions of the styling path may be performed in way that generates variations of the remainder of the styling path in a certain order, so that the first style context with an identifier that matches an iteratively generated variation of the remainder is used to render the view component.

In a first round of iterations, one or more portions may be removed from the middle of the styling path until the styling path contains only a beginning and an end. Variations of the remainder of the styling path in the first round of iterations may be generated in the following exemplary order:

collection.choice.choices.fieldTitle.text.regularText
    collection.choice.choices.text.regularText
    collection.choice.text.regularText
    collection.choice.regularText
    collection.regularText Other variations that involve the removal of the middle portions of the styling path may also be included in the first round of iterations.

The first round of iterations may be followed by a second round of iterations in which the beginning is removed from the styling path, and one or more portions are subsequently removed from the remainder of the styling path to generate variations on the remainder of the styling path. The second round of iterations may include the following exemplary order of variations on the remainder of the styling path:

choice.choices.fieldTitle.text.regularText
    choice.choices.text.regularText
    choice.text.regularText
    choice.regularText The second round of iterations may be recursively applied to a gradually diminishing remainder of the styling path until only the end of the styling path remains. Recursive application of the second round of iterations may produce the following exemplary order of variations on the remainder of the styling path:

choices.fieldTitle.text.regularText
    choices.fieldTitle.regularText
    choices.regularText
    fieldTitle.text.regularText
    fieldTitle.regularText
    regularText Iterative removal of portions of the styling path may thus be conducted to find the closest possible match between the styling path and a style context in collection 208. For example, the iterations described above may result in the matching of the styling path to the following structured representation of a style context:

```
<key>choice.choices.fieldTitle.textregularText</key>
<dict>
    <key>UILabel</key>
    <dict>
        <key>TextColor</key>
        <string>#34b8f4</string>
        <key>NumberOfLines</key>
        <integer>0</integer>
        <key>TextAlignment</key>
        <string>NSTextAlignmentCenter</string>
        <key>font</key>
        <dict>
            <key>Family</key>
            <string>Avenir-Light</string>
            <key>Size</key>
            <integer>24</integer>
        </dict>
    </dict>
</dict>
```

The structured representation may indicate an exact match of the style context with the first value produced in the second round of iterations, or "choice.choices.fieldTitle.text.regularText." The structured representation may also specify a number of styling attributes under a "UILabel" sub-context, including attributes for "TextColor," "NumberOfLines," "TextAlignment," "NSTextAlignmentCenter," and "font." The "font" styling attribute may additionally include sub-attributes of "Family" and "Size." Consequently, the structured representation may be used to render text in the view component using a certain color (e.g., "#34b8f4"), number of lines (e.g., "0"), text alignment (e.g., "NSTextAlignmentCenter"), font family (e.g., "Avenir-Light"), and font size (e.g., "24").

One or more portions of the styling path may also be matched to a wildcard pattern instead of an exact identifier for the style context. For example, the "collection.choice.choices.fieldTitle.text.regularText" styling path may be matched to wildcard patterns such as "collection.choice.*.regularText," "collection.*.text.regularText," and/or "collection.*.regularText." Such wildcard-based matching of the styling path to the style context may be performed if the entire styling path cannot be matched to an identifier for a style context. If the styling path fails to match one or more wildcard patterns, one or more portions of the styling path may be iteratively removed until a remainder of the styling path matches the identifier and/or a wildcard pattern.

Figure 3:
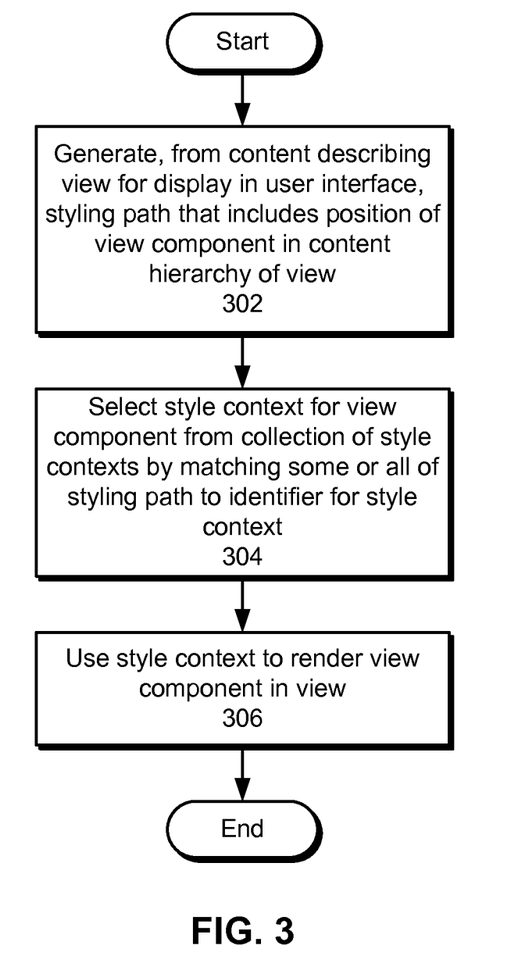
FIG. 3 shows a flowchart illustrating the process of rendering a view component in a user interface of an application on an electronic device in accordance with the disclosed embodiments.

FIG. 3 shows a flowchart illustrating the process of rendering a view component in a user interface of an application on an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a styling path that includes a position of a view component in a content hierarchy of a view for display in the user interface is generated from content describing the view (operation 302). The styling path may be generated by appending one or more layers of the content hierarchy between the view component and a top of the content hierarchy to the styling path. For example, the styling path may specify the types of all layers in the content hierarchy between the top and the view component.

Next, a style context for the view component is selected from a collection of style contexts by matching some or all of the styling path to an identifier for the style context (operation 304). To match at least a subset of the styling path to the identifier for the style context, the collection of style contexts may first be searched for an identifier that exactly matches the styling path. When the collection does not include the identifier that exactly matches the styling path, the styling path may be matched to a wildcard pattern instead of an exact identifier for the style context. If the styling path does not match any wildcard patterns, one or more portions of the styling path may be iteratively removed until a remainder of the styling path that matches the identifier and/or a wildcard pattern is found, as described in further detail below with respect to FIG. 4.

Finally, the style context is used to render the view component in the view (operation 306). For example, style attributes in the style context may be passed as configuration parameters to a platform-specific user-interface component that implements the view component on a platform of the electronic device. The configuration parameters may be used to adjust the appearance and/or behavior of the platform-specific user-interface component during instantiation of the platform-specific user-interface component.

Figure 4:
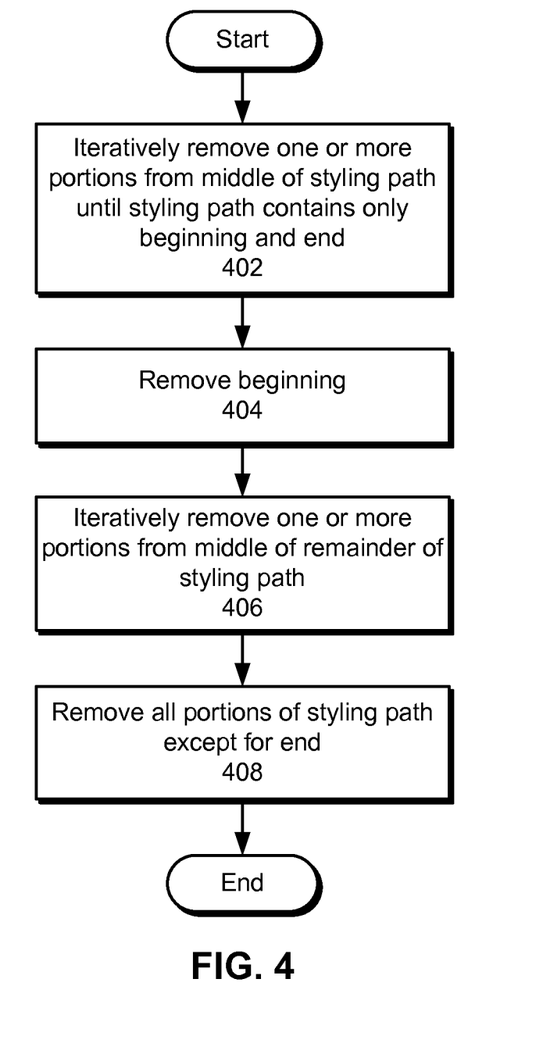
FIG. 4 shows a flowchart illustrating the exemplary process of iteratively removing one or more portions of a styling path for a view component in accordance with the disclosed embodiments.

FIG. 4 shows a flowchart illustrating the exemplary process of iteratively removing one or more portions of a styling path for a view component in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, one or more portions are removed from the middle of the styling path until the styling path contains only a beginning and an end (operation 402). Next, the beginning is removed from the styling path (operation 404), and one or more portions from the middle of the remainder of the styling path may iteratively be removed (operation 406) to produce one or more variations of the remainder. Operations 404 and 406 may recursively be applied to the styling path, so that the styling path is shortened from the beginning one layer at a time, and each shortening from the beginning is followed by the removal of additional layers from the middle of the remaining portions of the remainder. Finally, all portions of the styling path are removed except for the end (operation 408). The process may be discontinued once a variation on the remainder of the styling path that matches an identifier and/or a wildcard pattern for a style context is generated.

Figure 5:
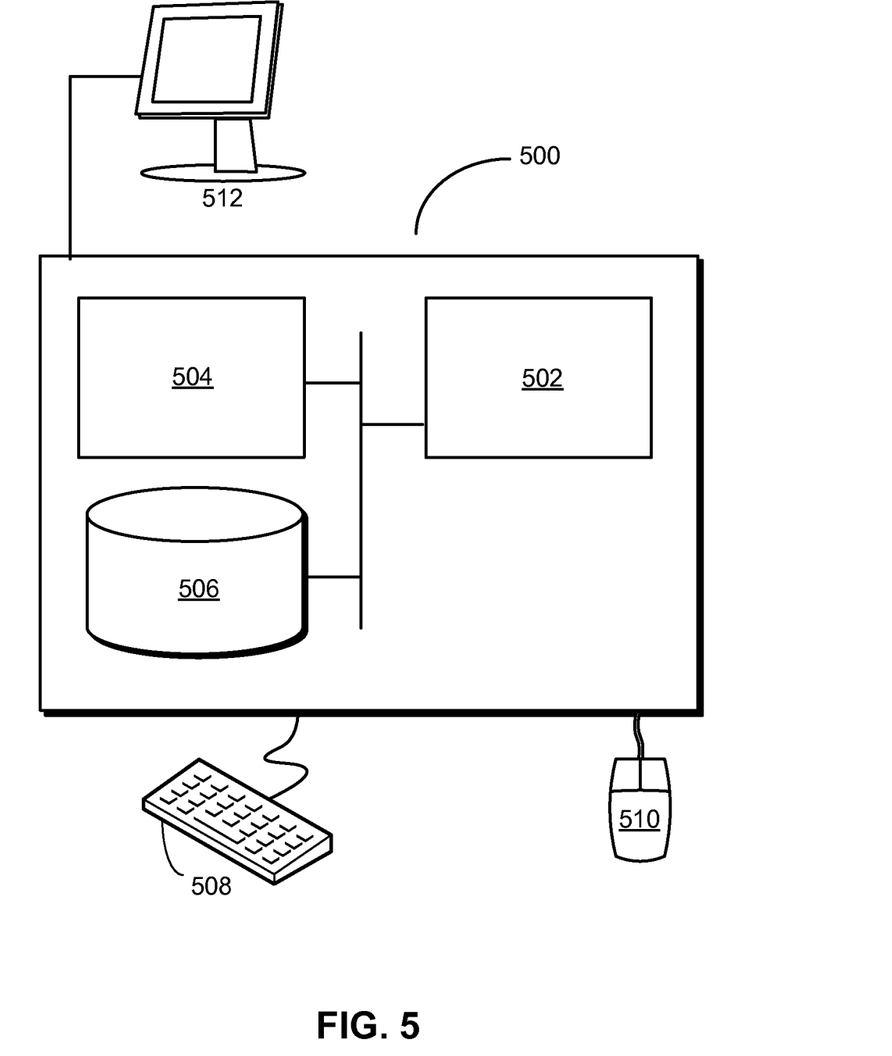
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for rendering a view component in a user interface of an application on an electronic device. The system may include a styling component that generates, from content describing a view for display in the user interface, a styling path for the view component that includes a position of the view component in a content hierarchy of the view. Next, the styling component may select a style context for the view component from a collection of style contexts by matching at least a subset of the styling path to an identifier for the style context. The styling component may then use the style context to render the view component in the view.

In addition, one or more components of computer system 500 may be remotely located and connected to the other components over a network. Portions of the present embodiments (e.g., rendering apparatus, processing apparatus, orchestrator, rendering components, server, etc.) may also be located on different nodes of a distributed system that implements the embodiments. For example, the present embodiments may be implemented using a cloud computing system that manages the rendering of platform-independent content by a set of platform-specific rendering components on a set of remote electronic devices.

The data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for rendering a view component in a user interface of an application on an electronic device, comprising:
    obtaining, at an electronic device over a network from a remote server, structured platform agnostic data describing a view for display in a user interface of an application;
    generating, from the structured platform agnostic data, a styling path string that includes a set of content identifiers, wherein each content identifier in the styling path string corresponds to:
        a view component in a content hierarchy of the view,
        a position of the view component in the content hierarchy of the view, and
        a layer of a set of layers, wherein each layer is associated with a type of view component that encapsulates the view component;
    determining that a collection of style contexts from the structured platform agnostic data does not include an exact match for the styling path string based on matching the styling path string to each identifier for a style context in the collection of style contexts;
    generating variations of a styling path remainder by iteratively removing at least one content identifier:
        from a middle of the styling path string in a first round of iterations to generate a first set of variations of the styling path remainder; and
        from a beginning of a styling path remainder of the first set of variations of the styling path remainder in a second round of iterations to generate a second set of variations of the styling remainder, wherein each variation of the styling path remainder maintains the last content identifier;
    selecting, by a styling component executing on a processor in the electronic device, the style context from the collection of style contexts for the view component that matches one of the variations of the styling path remainder of the first set of variations from the first round of iterations or the second set of variations from the second round of iterations to an identifier for the style context;
    formatting the view component to fit dimensions of an output device of the electronic device;
    executing the application based on source code; and
    during execution of the application, rendering, by a platform specific component executing on the processor in the electronic device and based on the selected style context, the view component according to the position in the content hierarchy of the view in the user interface of the application on the output device of the electronic device.

2. The method of claim 1, wherein generating the styling path string comprises: appending one or more layers of the content hierarchy between a plurality of view components and a top of the content hierarchy to the styling path string.

3. The method of claim 1, wherein matching the styling path remainder to the identifier for the style context comprises: matching the styling path remainder to a wildcard pattern.

4. The method of claim 1, wherein the content hierarchy comprises at least one of:
    a field;
    an asset;
    a label; and
    a value.

5. The method of claim 1, wherein the style context comprises at least one of:
    an alignment;
    font;
    a color;
    margin; and
    a size.

6. The method of claim 1, further comprising:
    receiving, in the platform agnostic data, a view update for the user interface;
    generating an updated styling path string based on the user interface update; and
    executing the application based on the updated style path string without updating the source code.

7. The method of claim 1, wherein determining that the collection of style contexts does not include the exact match for the styling path string indicates that a context of the application on the electronic device is incompatible with the exact match for the styling path string.

8. The method of claim 7, wherein by matching the styling path remainder to the identifier for the style context indicates that the context of the application is compatible with the styling path remainder.

9. The method of claim 7, wherein the context of the application comprises:
    an orientation of the electronic device;
    a form factor of the electronic device;
    input devices of the electronic device;
    output devices of the electronic device;
    an operating system of the electronic device; and
    a type of the processor.

10. An apparatus, comprising:
    an output device;
    a processor; and
    a memory storing instructions that, when executed by the processor, cause the apparatus to:
        obtain, at an electronic device over a network from a remote server, structured platform agnostic data describing a view for display in a user interface of an application;
        generate, from the structured platform agnostic data, a styling path string that includes a set of content identifiers, wherein each content identifier in the styling path string corresponds to:

a view component in a content hierarchy of the view,
a position of the view component in the content hierarchy of the view, and
a layer of a set of layers, wherein each layer is associated with a type of view component that encapsulates the view component;
determine that a collection of style contexts from the structured platform agnostic data does not include an exact match for the styling path string based on matching the styling path string to each identifier for a style context;
generate variations of a styling path remainder by iteratively removing at least one content identifier:
from a middle of the styling path string in a first round of iterations to generate a firsts set of variations of the styling path remainder; and
from a beginning of a styling path remainder of the first set of variation of the styling path remainder in a second round of iterations to generate a second set of variations of the styling path remainder, wherein each variation of the styling path remainder maintains a last content identifier;
select, by a styling component executing on a processor in the electronic device, the style context from the collection of style contexts for the view component that matches one of the variations of the styling path remainder of the first set of variations from the first round of iterations or the second set of variations from the second round of iterations to an identifier for the style context;
format the view component to fit dimensions of the output device;
execute the application based on source code; and
during execution of the application, render, by a platform specific component executing on the processor in the electronic device and based on the selected style context, the view component according to the position in the content hierarchy of the view in the user interface of the application on the output device.

11. The apparatus of claim 10, wherein generating the styling path string comprises: appending one or more layers of the content hierarchy between a plurality of view components and a top of the content hierarchy to the styling path string.

12. The apparatus of claim 10, wherein matching the styling path remainder to the identifier for the style context comprises: matching the styling path remainder to a wildcard pattern.

13. The apparatus of claim 10, wherein determining that the collection of style contexts does not include the exact match for the styling path string indicates that a context of the application is incompatible with the exact match for the styling path.

14. The apparatus of claim 13, wherein by matching the styling path remainder to the identifier for the style context indicates that the context of the application is compatible with the styling path remainder.

15. The apparatus of claim 13, wherein the context of the application comprises:
an orientation of the apparatus;
a form factor of the apparatus;
input devices of the apparatus;
additional output devices of the apparatus;
an operating system of the apparatus; and
a type of the processor.

16. A non-transitory computer-readable storage medium storing instructions that when executed by a computer cause the computer to perform a method of rendering a view component in a user interface of an application on an electronic device, the method comprising:
obtaining, at an electronic device over a network from a remote server, structured platform agnostic data describing a view for display in a user interface of an application;
generating, from the structured platform agnostic data, a styling path string that includes a set of content identifiers, wherein each content identifier in the styling path string corresponds to:
a view component in a content hierarchy of the view,
a position of the view component in the content hierarchy of the view, and
a layer of a set of layers, wherein each layer is associated with a type of view component that encapsulates the view component;
determining that a collection of style contexts from the structured platform agnostic data does not include an exact match for the styling path string based on matching the styling path string to each identifier for a style context;
generating variations of a styling path remainder by iteratively removing at least one content identifier:
from a middle of the styling path string in a first round of iterations to generate a first set of variations of the styling path remainder; and
from a beginning of a styling path remainder of the first set of variations of the styling path remainder in a second round of iterations to generate a second set of variations of the styling path remainder, wherein each variation of the styling path remainder maintains a last content identifier of the styling path string;
selecting, by a styling component executing on a processor in the electronic device, the style context from the collection of style contexts for the view component that matches one of the variations of the styling path remainder of the first set of variations from the first round of iterations or the second set of variations from the second round of iterations to an identifier for the style context;
formatting the view component to fit dimensions of an output device of the electronic device;
executing the application based on source code; and
during execution of the application, rendering, by a platform specific component executing on the processor in the electronic device and based on the selected style context, the view component according to the position in the content hierarchy of the view in the user interface of the application on the output device of the electronic device.

17. The non-transitory computer-readable storage medium of claim 16, wherein determining that the collection of style contexts does not include the exact match for the styling path string indicates that a context of the application on the electronic device is incompatible with the exact match for the styling path string.

18. The non-transitory computer-readable storage medium of claim 17, wherein by matching the styling path remainder to the identifier for the style context indicates that the context of the application is compatible with the styling path remainder.

19. The non-transitory computer-readable storage medium of claim 16, wherein generating the styling path string comprises: appending one or more layers of the content hierarchy between a plurality of view components and a top of the content hierarchy to the styling path string.

20. The non-transitory computer-readable storage medium of claim 16, wherein matching the styling path remainder to the identifier for the style context comprises: matching the styling path remainder to a wildcard pattern.

* * * * *